(12) United States Patent
Veillette

(10) Patent No.: US 8,970,394 B2
(45) Date of Patent: Mar. 3, 2015

(54) AGGREGATED REAL-TIME POWER OUTAGES/RESTORATION REPORTING (RTPOR) IN A SECURE MESH NETWORK

(75) Inventor: Michel Veillette, Waterloo (CA)

(73) Assignee: Trilliant Holdings Inc., Redwood City, CA (US)

( * ) Notice: Subject to any disclaimer, the term of this patent is extended or adjusted under 35 U.S.C. 154(b) by 624 days.

(21) Appl. No.: 13/356,910

(22) Filed: Jan. 24, 2012

(65) Prior Publication Data

US 2012/0192025 A1 Jul. 26, 2012

Related U.S. Application Data

(60) Provisional application No. 61/435,822, filed on Jan. 25, 2011.

(51) Int. Cl.
| | | |
|---|---|---|
| G08B 23/00 | (2006.01) | |
| G08C 15/06 | (2006.01) | |
| H04L 29/08 | (2006.01) | |
| H04L 1/18 | (2006.01) | |
| H04W 8/24 | (2009.01) | |
| H04W 28/04 | (2009.01) | |
| H04W 28/06 | (2009.01) | |

(52) U.S. Cl.
CPC ............ *H04L 67/025* (2013.01); *H04L 1/188* (2013.01); *H04W 8/24* (2013.01); *H04W 28/04* (2013.01); *H04W 28/06* (2013.01)
USPC ................................. 340/870.02; 340/870.01

(58) Field of Classification Search
CPC ............................. H04W 84/18; H04W 24/02
USPC ........................................ 340/870.01, 870.02
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |

(Continued)

FOREIGN PATENT DOCUMENTS

| | | | | |
|---|---|---|---|---|
| EP | 0 578 041 B1 | 11/1999 | | H04L 12/56 |
| EP | 0 663 746 B1 | 1/2003 | | H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Daniel Wu
*Assistant Examiner* — Kam Ma
(74) *Attorney, Agent, or Firm* — Moser Taboada

(57) ABSTRACT

Embodiments of the invention provide systems and methods for the reporting of status changes, such as but not limited to power outages and/or power restorations, throughout a smart grid system. Through the use of location-based reporting period selection and/or status change report aggregation, embodiments may provide efficient reporting processes that timely and accurately report status change information from the point(s) of the change to a back-end system via an access point.

39 Claims, 3 Drawing Sheets

(56) References Cited

U.S. PATENT DOCUMENTS

| | | | |
|---|---|---|---|
| 4,638,314 A | 1/1987 | Keller | 340/870.02 |
| 4,644,320 A | 2/1987 | Carr et al. | 340/12.37 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | 1/1 |
| 5,465,398 A | 11/1995 | Flammer | 455/69 |
| 5,467,345 A | 11/1995 | Cutler, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A * | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colten et al. | 340/870.02 |
| 6,240,080 B1 | 5/2001 | Okanoue | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |

(56) References Cited

U.S. PATENT DOCUMENTS

| | | | | |
|---|---|---|---|---|
| 6,684,245 | B1 | 1/2004 | Shuey et al. | 709/223 |
| 6,687,901 | B1 | 2/2004 | Imamatsu | 717/173 |
| 6,691,173 | B2 | 2/2004 | Morris et al. | 709/249 |
| 6,697,331 | B1 | 2/2004 | Riihinen et al. | 370/236 |
| 6,710,721 | B1 | 3/2004 | Holowick | 340/870.02 |
| 6,711,166 | B1 | 3/2004 | Amir et al. | 370/395.1 |
| 6,711,409 | B1 | 3/2004 | Zavgren, Jr. et al. | 455/445 |
| 6,711,512 | B2 | 3/2004 | Noh | 702/65 |
| 6,714,787 | B2 | 3/2004 | Reed et al. | 455/445 |
| 6,718,137 | B1 | 4/2004 | Chin | 398/3 |
| 6,725,281 | B1 | 4/2004 | Zintel et al. | 719/318 |
| 6,728,514 | B2 | 4/2004 | Bandeira et al. | 455/13.1 |
| 6,747,545 | B2 | 6/2004 | Petite et al. | 340/540 |
| 6,747,981 | B2 | 6/2004 | Ardalan et al. | 370/401 |
| 6,751,445 | B2 | 6/2004 | Kasperkovitz et al. | 455/76 |
| 6,751,455 | B1 | 6/2004 | Acampora | 455/414.1 |
| 6,751,672 | B1 | 6/2004 | Khalil et al. | 709/230 |
| 6,772,052 | B1 | 8/2004 | Amundsen et al. | 700/291 |
| 6,775,258 | B1 | 8/2004 | van Valkenburg et al. | 370/338 |
| 6,778,099 | B1 | 8/2004 | Mayer et al. | 340/870.02 |
| 6,785,592 | B1 | 8/2004 | Smith et al. | 700/291 |
| 6,798,352 | B2 | 9/2004 | Holowick | 340/870.02 |
| 6,801,865 | B2 | 10/2004 | Gilgenbach et al. | 702/61 |
| 6,826,620 | B1 | 11/2004 | Mawhinney et al. | 709/235 |
| 6,829,216 | B1 | 12/2004 | Nakata | 370/228 |
| 6,829,347 | B1 | 12/2004 | Odiaka | 379/220.01 |
| 6,831,921 | B2 | 12/2004 | Higgins | 370/230 |
| 6,836,737 | B2 | 12/2004 | Petite et al. | 702/62 |
| 6,839,775 | B1 | 1/2005 | Kao et al. | 710/15 |
| 6,842,706 | B1 | 1/2005 | Baraty | 702/61 |
| 6,845,091 | B2 * | 1/2005 | Ogier et al. | 370/338 |
| 6,859,186 | B2 | 2/2005 | Lizalek et al. | 343/767 |
| 6,865,185 | B1 | 3/2005 | Patel et al. | 370/412 |
| 6,882,635 | B2 | 4/2005 | Eitan et al. | 370/338 |
| 6,885,309 | B1 | 4/2005 | Van Heteren | 340/870.11 |
| 6,891,838 | B1 | 5/2005 | Petite et al. | 370/401 |
| 6,900,738 | B2 | 5/2005 | Crichlow | 340/870.02 |
| 6,904,025 | B1 | 6/2005 | Madour et al. | 370/328 |
| 6,904,385 | B1 | 6/2005 | Budike, Jr. | 702/182 |
| 6,909,705 | B1 | 6/2005 | Lee et al. | 370/331 |
| 6,914,533 | B2 | 7/2005 | Petite | 340/628 |
| 6,914,893 | B2 | 7/2005 | Petite | 370/338 |
| 6,946,972 | B2 | 9/2005 | Mueller et al. | 340/870.02 |
| 6,954,814 | B1 | 10/2005 | Leach | 710/305 |
| 6,963,285 | B2 | 11/2005 | Fischer et al. | 340/635 |
| 6,967,452 | B2 | 11/2005 | Aiso et al. | 318/466 |
| 6,970,434 | B1 | 11/2005 | Mahany et al. | 370/256 |
| 6,970,771 | B1 | 11/2005 | Preiss et al. | 700/286 |
| 6,975,613 | B1 | 12/2005 | Johannson | 370/338 |
| 6,980,973 | B1 | 12/2005 | Karpenko | 705/412 |
| 6,982,651 | B2 | 1/2006 | Fischer | 340/870.02 |
| 6,985,087 | B2 | 1/2006 | Soliman | 340/870.02 |
| 6,995,666 | B1 | 2/2006 | Luttrell | 340/539.1 |
| 6,999,441 | B2 | 2/2006 | Flammer, III et al. | 370/337 |
| 7,009,379 | B2 | 3/2006 | Ramirez | 324/142 |
| 7,009,493 | B2 | 3/2006 | Howard et al. | 340/7.1 |
| 7,010,363 | B2 | 3/2006 | Donnelly et al. | 700/19 |
| 7,016,336 | B2 | 3/2006 | Sorensen | 370/351 |
| 7,020,701 | B1 | 3/2006 | Gelvin et al. | 709/224 |
| 7,042,368 | B2 | 5/2006 | Patterson et al. | 340/870.29 |
| 7,046,682 | B2 | 5/2006 | Carpenter et al. | 370/401 |
| 7,053,767 | B2 | 5/2006 | Petite et al. | 340/531 |
| 7,053,853 | B2 | 5/2006 | Merenda et al. | 343/820 |
| 7,054,271 | B2 | 5/2006 | Brownrigg et al. | 370/238 |
| 7,062,361 | B1 | 6/2006 | Lane | 700/295 |
| 7,064,679 | B2 | 6/2006 | Ehrke et al. | 340/870.02 |
| 7,072,945 | B1 | 7/2006 | Nieminen et al. | 709/217 |
| 7,079,810 | B2 | 7/2006 | Petite et al. | 455/41.2 |
| 7,089,089 | B2 | 8/2006 | Cumming et al. | 700/295 |
| 7,102,533 | B2 | 9/2006 | Kim | 340/870.02 |
| 7,103,086 | B2 | 9/2006 | Steed et al. | 375/132 |
| 7,103,511 | B2 | 9/2006 | Petite | 702/188 |
| 7,106,044 | B1 | 9/2006 | Lee, Jr. et al. | 324/110 |
| 7,119,713 | B2 | 10/2006 | Shuey et al. | 340/870.02 |
| 7,126,494 | B2 | 10/2006 | Ardalan et al. | 340/870.02 |
| 7,135,850 | B2 | 11/2006 | Ramirez | 324/142 |
| 7,135,956 | B2 | 11/2006 | Bartone et al. | 340/3.9 |
| 7,137,550 | B1 | 11/2006 | Petite | 235/379 |
| 7,143,204 | B1 | 11/2006 | Kao et al. | 710/18 |
| 7,145,474 | B2 | 12/2006 | Shuey et al. | 340/870.03 |
| 7,170,425 | B2 | 1/2007 | Christopher et al. | 340/870.02 |
| 7,174,260 | B2 | 2/2007 | Tuff et al. | 702/61 |
| 7,185,131 | B2 | 2/2007 | Leach | 710/305 |
| 7,188,003 | B2 | 3/2007 | Ransom et al. | 700/286 |
| 7,197,046 | B1 | 3/2007 | Hariharasubrahmanian | 370/466 |
| 7,200,633 | B2 | 4/2007 | Sekiguchi et al. | 709/203 |
| 7,209,840 | B2 | 4/2007 | Petite et al. | 702/62 |
| 7,215,926 | B2 | 5/2007 | Corbett et al. | 455/41.2 |
| 7,222,111 | B1 | 5/2007 | Budike, Jr. | 705/412 |
| 7,230,544 | B2 | 6/2007 | Van Heteren | 340/870.03 |
| 7,230,931 | B2 | 6/2007 | Struhsaker | 370/280 |
| 7,231,482 | B2 | 6/2007 | Leach | 710/305 |
| 7,245,938 | B2 | 7/2007 | Sobczak et al. | 455/562.1 |
| 7,248,181 | B2 | 7/2007 | Patterson et al. | 340/870.03 |
| 7,248,861 | B2 | 7/2007 | Lazaridis et al. | 455/414.1 |
| 7,250,874 | B2 | 7/2007 | Mueller et al. | 340/870.06 |
| 7,251,570 | B2 | 7/2007 | Hancock et al. | 702/57 |
| 7,263,073 | B2 | 8/2007 | Petite et al. | 370/278 |
| 7,266,158 | B2 * | 9/2007 | Matsumura | 375/295 |
| 7,271,735 | B2 | 9/2007 | Rogai | 340/870.02 |
| 7,274,305 | B1 | 9/2007 | Luttrell | 340/870.02 |
| 7,274,975 | B2 | 9/2007 | Miller | 700/295 |
| 7,277,027 | B2 | 10/2007 | Ehrke et al. | 340/870.12 |
| 7,277,967 | B2 | 10/2007 | Kao et al. | 710/18 |
| 7,289,887 | B2 | 10/2007 | Rodgers | 700/295 |
| 7,295,128 | B2 | 11/2007 | Petite | 340/628 |
| 7,301,476 | B2 | 11/2007 | Shuey et al. | 340/870.03 |
| 7,304,587 | B2 * | 12/2007 | Boaz | 340/870.02 |
| 7,308,370 | B2 * | 12/2007 | Mason et al. | 702/65 |
| 7,312,721 | B2 | 12/2007 | Mason, Jr. et al. | 340/870.02 |
| 7,315,257 | B2 | 1/2008 | Patterson et al. | 340/870.02 |
| 7,317,404 | B2 | 1/2008 | Cumeralto et al. | 340/870.02 |
| 7,321,316 | B2 | 1/2008 | Hancock et al. | 340/870.02 |
| 7,324,453 | B2 | 1/2008 | Wu et al. | 370/238 |
| 7,327,998 | B2 | 2/2008 | Kumar et al. | 455/405 |
| 7,346,463 | B2 | 3/2008 | Petite et al. | 702/62 |
| 7,348,769 | B2 | 3/2008 | Ramirez | 324/158.1 |
| 7,349,766 | B2 | 3/2008 | Rodgers | 700/295 |
| 7,362,709 | B1 | 4/2008 | Hui et al. | 370/237 |
| 7,366,113 | B1 | 4/2008 | Chandra et al. | 370/255 |
| 7,366,191 | B2 | 4/2008 | Higashiyama | 370/406 |
| 7,379,981 | B2 | 5/2008 | Elliott et al. | 709/220 |
| 7,397,907 | B2 | 7/2008 | Petite | 379/155 |
| 7,406,298 | B2 | 7/2008 | Luglio et al. | 455/90.3 |
| 7,411,964 | B2 | 8/2008 | Suemura | 370/400 |
| 7,427,927 | B2 | 9/2008 | Borleske et al. | 340/870.02 |
| 7,451,019 | B2 | 11/2008 | Rodgers | 700/295 |
| 7,457,273 | B2 | 11/2008 | Nakanishi et al. | 370/338 |
| 7,468,661 | B2 | 12/2008 | Petite et al. | 340/540 |
| 7,487,282 | B2 | 2/2009 | Leach | 710/305 |
| 7,495,578 | B2 | 2/2009 | Borleske | 340/870.02 |
| 7,498,873 | B2 | 3/2009 | Opshaug et al. | 329/315 |
| 7,505,453 | B2 | 3/2009 | Carpenter et al. | 370/352 |
| 7,512,234 | B2 | 3/2009 | McDonnell et al. | 380/247 |
| 7,515,571 | B2 | 4/2009 | Kwon et al. | 370/338 |
| 7,516,106 | B2 | 4/2009 | Ehlers et al. | 705/412 |
| 7,522,540 | B1 | 4/2009 | Maufer | 370/254 |
| 7,522,639 | B1 | 4/2009 | Katz | 370/503 |
| 7,539,151 | B2 | 5/2009 | Demirhan et al. | 370/254 |
| 7,545,285 | B2 | 6/2009 | Shuey et al. | 340/870.02 |
| 7,546,595 | B1 | 6/2009 | Wickham et al. | |
| 7,548,826 | B2 | 6/2009 | Witter et al. | 702/115 |
| 7,548,907 | B2 | 6/2009 | Wall et al. | 1/1 |
| 7,554,941 | B2 | 6/2009 | Ratiu et al. | 370/328 |
| 7,562,024 | B2 | 7/2009 | Brooks et al. | 705/1.1 |
| 7,571,865 | B2 | 8/2009 | Nicodem et al. | 236/51 |
| 7,586,420 | B2 | 9/2009 | Fischer et al. | 340/635 |
| 7,599,665 | B2 | 10/2009 | Sinivaara | 455/67.16 |
| 7,602,747 | B2 | 10/2009 | Maksymczuk et al. | 370/331 |
| 7,609,673 | B2 | 10/2009 | Bergenlid et al. | 370/329 |
| 7,613,147 | B2 | 11/2009 | Bergenlid et al. | 370/329 |
| 7,623,043 | B2 | 11/2009 | Mizra et al. | 340/870.02 |
| 7,626,967 | B2 | 12/2009 | Yarvis et al. | 370/338 |
| 7,650,425 | B2 | 1/2010 | Davis et al. | 709/238 |

(56) References Cited

U.S. PATENT DOCUMENTS

| | | | |
|---|---|---|---|
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1 | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/328 |
| 7,847,706 B1 | 12/2010 | Ross et al. | 340/12.52 |
| 7,911,359 B2* | 3/2011 | Walters et al. | 340/870.11 |
| 8,051,415 B2 | 11/2011 | Suzuki | 717/168 |
| 8,059,011 B2* | 11/2011 | Van Wyk et al. | 340/870.11 |
| 8,582,481 B2* | 11/2013 | Kim et al. | 370/311 |
| 8,625,496 B2* | 1/2014 | Brownrigg et al. | 370/328 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/466 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0061605 A1* | 4/2004 | Howard | 340/539.11 |
| 2004/0066310 A1 | 4/2004 | Ehrke et al. | 340/870.02 |
| 2004/0077341 A1 | 4/2004 | Chandranmenon et al. | 455/418 |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki et al. | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0239414 A1* | 10/2005 | Mason et al. | 455/69 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1* | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |

(56) References Cited

U.S. PATENT DOCUMENTS

| | | | |
|---|---|---|---|
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0184341 A1* | 7/2008 | Sebesta et al. | 726/4 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer et al. | 370/338 |
| 2008/0317401 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/256 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakraborty et al. | 379/201.03 |
| 2009/0132220 A1 | 5/2009 | Chakraborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1 | 5/2009 | Veillette | 380/279 |
| 2009/0138617 A1* | 5/2009 | Veillette | 709/238 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0238917 A1 | 9/2010 | Silverman et al. | 370/350 |
| 2010/0256830 A1 | 10/2010 | Kressner et al. | 700/291 |
| 2010/0328031 A1* | 12/2010 | Powers et al. | 340/5.64 |
| 2010/0332359 A1* | 12/2010 | Powers et al. | 705/28 |
| 2011/0004358 A1 | 1/2011 | Pollack et al. | 700/297 |
| 2011/0035073 A1 | 2/2011 | Ozog | 700/291 |
| 2011/0066297 A1 | 3/2011 | Saberi et al. | 700/287 |
| 2012/0192025 A1* | 7/2012 | Veillette | 714/749 |

FOREIGN PATENT DOCUMENTS

| | | | |
|---|---|---|---|
| EP | 0 812 502 B1 | 8/2004 | H04L 12/28 |
| EP | 0 740 873 B1 | 12/2005 | H04L 12/44 |
| JP | 10-070774 | 3/1998 | H04Q 5/00 |
| JP | 10-135965 | 5/1998 | H04L 12/28 |
| WO | WO 95/12942 | 5/1995 | H04L 12/44 |
| WO | WO 96/10307 | 4/1996 | H04L 12/28 |
| WO | WO 96/10307 A1 | 4/1996 | H04L 12/28 |
| WO | WO 00/54237 | 9/2000 | G08B 23/00 |
| WO | WO 01/26334 A2 | 4/2001 | H04L 29/06 |
| WO | WO 01/55865 A1 | 8/2001 | G06F 13/00 |
| WO | WO 03/015452 | 2/2003 | H04Q 9/00 |
| WO | WO 2005/091303 | 9/2005 | G06F 9/445 |
| WO | WO 2006/059195 | 6/2006 | G05D 3/12 |
| WO | WO 2007/015822 | 8/2007 | H04L 12/28 |
| WO | WO 2007/132473 | 11/2007 | G08C 17/00 |
| WO | WO 2008/027457 | 3/2008 | G08B 23/00 |
| WO | WO 2008/033287 A2 | 3/2008 | G08B 23/00 |
| WO | WO 2008/033514 A2 | 3/2008 | G08B 25/00 |
| WO | WO 2008/038072 | 4/2008 | H04Q 7/24 |
| WO | WO 2008/092268 A1 | 8/2008 | G01D 7/06 |
| WO | WO 2009/067251 | 5/2009 | G08C 19/00 |

OTHER PUBLICATIONS

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

(56) References Cited

OTHER PUBLICATIONS

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department*, University of California, Berkeley, 12 pp., 1996.

Johnson, David B., "Routing in Ad Hoc Networks of Mobile Hosts," *IEEE*, pp. 158-163, 1995.

Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987).

Nachum Shacham & Janet D. Tornow, Future Directions in Packet Radio Technology, Proc. of the IEEE Infocom 1985 at 93 (Mar. 1985). 17 pp.

John Jubin & Janet D. Tornow, The DARPA Packet Radio Network Protocols, Proc. of the IEEE, vol. 75, No. 1 at 21 (Jan. 87).

John Jubin, Current Packet Radio Network Protocols, Proc. of the IEEE Infocom1985 at 86 (Mar. 1985), 9 pp.

David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.

David B. Johnson, Mobile Host Internetworking Using IP Loose Source Routing, Carnegie Mellon University CMU-CS-93-128, DARPA Order No. 7330 (Feb. 1993), 18 pp.

Daniel M. Frank, Transmission of IP Datagrams Over NET/ROM Networks, Proc. of the ARRL 7th Computer Networking Conference 1988 at 65 (Oct. 1988), 6 pp.

Robert E. Kahn, et al., Advances in Packet Radio Technology, Proc. of the IEEE, vol. 66, No. 11, pp. 1468-1496 (Nov. 1978).

Clifford A. Lynch & Edwin B. Brownrigg, Packet Radio Networks, Pergamon Press, (1987), 121 pp.

Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.

William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.

Nachum Shacham & Jil Westcott, Future Directions in Packet Radio Architectures and Protocols, Proc. of the IEEE, vol. 75, No. 1 at 83 (Jan. 1987), 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

(56) References Cited

OTHER PUBLICATIONS

J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.
Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13 ,Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, *Route Optimization and Locations Updates for Mobile Hosts*, Proceedings of the 16$^{th}$ ICDCS, p. 319-326, 1996.
Daniel Cohen, Jonathan B. Postel, and Raphael Rom, *IP Addressing and Routing in a Local Wireless Network*, IEEE INFOCOM 1992, p. 5A.3.1-7.
Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.
Jonathan J. Hahn and David M. Stolle, *Packet Radio Network Routing Algorithms: A Survey*, IEEE Communications Magazine, vol. 22, No. 11, p. 41-7, Nov. 1984.
David A. Hall, *Tactical Internet System Architecture for the Task Force XXI*, IEEE 1996, p. 219-30.
Robert Hinden and Alan Sheltzer, *The DARPA Internet Gateway*, DARPA RFC 823, Sep. 1982, 45 pp.
Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico—Mayaguez, ACM 0-89791-568-2/93, p. 709-13, 1993.
David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.
David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.
F. G. Harrison, *Microwave Radio in the British TeleCom Access Network*, Second IEE National Conference on Telecommunications, Conference Publication No. 300, Apr. 2-5, 1989, p. 208-13.
Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.
Jil Westcott and Gregory Lauer, *Hierarchical Routing for Very Large Networks*, IEEE MILCOM 1984, Oct. 21-24, 1984, Conference Record vol. 2, p. 214-8.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-r12n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-r12n-routing-reqs-01.txt," IETF Standard-Working-Draft, Internet Engineering Task Force, IETF, CH, No. 1, Jul. 7, 2007. (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietforg/rfc/rfc0793.txt.
Supplementary European Search Report for Application No. EP 08 85 1927, dated Dec. 22, 2010, 10 pp.

(56) References Cited

OTHER PUBLICATIONS

Younis, M., et al., "Energy-Aware Routing in Cluster-Based Sensor Networks," Modeling, Analysis and Simulation of Computer and Telecommunications Systems, 10$^{th}$ IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, vol. Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, DEW Analysis of Renewable, PEV & Storage, Tempe, Arizona, 36 pp., Nov. 8-9, 2010.
"Network Device: Gateway Specification," ZigBee Alliance, ZigBee Document 075468r35, Revision 35, Version No. 1.0, 301 pp., Mar. 23, 2011.
International Search Report and Written Opinion for Application No. PCT/US12/28135, dated Jul. 5, 2012, 7 pp.
Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.
Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.
Charles E. Perkins and Pravin Bhagwat, *A Mobile Networking System Based on Internet Protocol*, IEEE Personal Communications, First Quarter 1994, IEEE 1994, p. 32-41.
Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.
Nachum Shacham and Earl J. Craighill, *Dynamic Routing for Real-Time Data Transport in Packet Radio Networks*, Proceedings of INFOCOM 1982, IEEE 1982, p. 152-58.
R. Lee Hamilton, Jr. and Hsien-Chuen Yu, *Optimal Routing in Multihop Packet Radio Networks*, IEEE 1990, p. 389-96.
Carl A. Sunshine, *Addressing Problems in Multi-Network Systems*, Proceedings of INFOCOM 1982, IEEE 1982, p. 12-18.
J.J. Garcia-Luna-Aceves, *Routing Management in Very Large-Scale Networks*, North-Holland, Future Generations Computer Systems 4, 1988, pp. 81-93.
J.J. Garcia-Luna-Aceves, *A Minimum-hop Routing Algorithm Based on Distributed Information*, North-Holland, Computer Networks and ISDN Systems 16, 1988/89, p. 367-382.
D. Hubner, J. Kassubek, F. Reichert, *A Distributed Multihop Protocol for Mobile Stations to Contact A Stationary Infrastructure*, Third IEE Conference on Telecommunications, Conference Publication No. 331, p. 204-7, 1991.
Jens Zander and Robert Forchheimer, *The SOFTNET Project: A Retrospect*, IEEE EUROCON, Jun. 13-17, 1988, p. 343-5.
Mario Gerla and Jack Tzu-Chich Tsai, *Multicluster, Mobile, Multimedia Radio Network*, Wireless Networks 1, J.C. Baltzer AG, Science Publishers, 1995, p. 255-265.

\* cited by examiner

AGGREGATED REAL-TIME POWER OUTAGES/RESTORATION REPORTING (RTPOR) IN A SECURE MESH NETWORK

CROSS-REFERENCE TO RELATED APPLICATIONS

The present application claims benefit of similarly titled U.S. Provisional Patent Application 61/435,822, filed Jan. 25, 2011, which is incorporated herein by reference in its entirety.

FIELD OF THE INVENTION

The present invention relates generally to reporting of status changes, such as but not limited to power outages and power restorations, within a smart grid system.

BACKGROUND OF THE INVENTION

In the utility delivery space, there have been numerous advances in technology in efforts to provide improved methods and systems for monitoring and controlling the delivery and use of various utilities (e.g., electricity, water, gas, etc). By way of specific example, smart grid systems, including advanced metering infrastructures ("AMIs") and the like, and have been developed which incorporate smart meters or existing meters retrofitted with modules that include at least a radio, configurable microprocessor and storage capacity. These meters are configured to communicate using predetermined protocols with other nodes such as other meters and WAN/NAN access points (i.e., collectors, bridges, mesh gates) in the smart grid across what is commonly referred to as a neighborhood area network ("NAN").

A smart grid system may be employed to monitor delivery of a utility, such as by reporting meter readings to back-end systems. For example, meters within the smart grid may determine if delivery of power is occurring or if there is a power outage, and may report power readings to the back-end server. The ability to achieve this monitoring automatically and wirelessly is an important advancement over the wired, drive-by or house-to-house meter reading methodologies of the past. A more detailed description of an exemplary smart grid system configuration and the various communications processes implemented across the smart grid are described in at least U.S. patent application Ser. No. 12/554,135, titled "System and Method for Implementing Mesh Network Communications Using a Mesh Network Protocol," which is incorporated herein by reference in its entirety.

The timely reporting of power outages and restoration across a NAN is critical to maintaining utility access for all customers. Accordingly, there is a need in the art for an efficient reporting process that is able to timely and accurately report outage and restoration information from the point of outage/restoration, across the NAN to the access point and eventually across the WAN to back-end systems for processing and, if necessary, acting on the reported information.

SUMMARY OF THE INVENTION

Embodiments of the invention provide systems and methods for the reporting of status changes, such as but not limited to power outages and/or power restorations, throughout a smart grid system. Through the use of location-based reporting period selection and/or status change report aggregation, embodiments may provide efficient reporting processes that timely and accurately report status change information from the point(s) of the change to a back-end system via an access point.

In one aspect of the invention a method for reporting a status change is provided. The method may include, for example, determining, by a mesh device, that a status change has occurred for a period of time at least as long as a predetermined recognition period. The method also includes determining, by the mesh device, one or more reporting windows within a reporting period. The one or more reporting windows may be determined based on a distance (e.g., number of hops) the mesh device is located from a NAN access point with which it is associated. The mesh device may also receive at least one child status change report from one or more child mesh devices associated with the NAN access point and may also prepare a device status change report, the device status change report including the one or more child status change reports. Finally, the mesh device may transmit the device status change report to one or more parent mesh devices during the reporting window within the reporting period. In certain embodiments, the method may further include listening, by the mesh device, for an acknowledgment from the one or more parent devices and, upon failing to receive the acknowledgement, repeating said receiving, preparing and transmitting.

In another aspect of the invention, a mesh device is provided. The mesh device may includes a processor that determines that a status change has occurred for a period of time at least as long as a predetermined recognition period; determines one or more reporting windows within a reporting period, based on a number of hops the mesh device is located from an access point with which it is associated; and prepares a device status change report. The mesh device may also include a transceiver that receives at least one child status change report from one or more child mesh devices associated with the access point; and transmits the device status change report to one or more parent mesh devices during the one or more reporting windows within the reporting period. Generally, the device status change report may include the one or more child status change reports.

In yet another aspect of the invention, a method of transmitting a status change to a server is provided. The method includes receiving, by an access point, a child status change report from a child mesh device associated with the access point, the child status change report including status change information for one or more child mesh devices that have experienced a status change. The method also includes, determining, by the access point, a random period based on a number of child mesh devices that have experienced a status change. The access point may prepare an access point status change report, including the information from the received child status change report; and may transmit the access point status change report to a server at a randomly selected time within the random period. In certain embodiments, the method may also include determining, by the access point, a retry period based on the number of child mesh devices that have experienced a status change; listening, by the access point, for an acknowledgement from the server; and upon failing to receive the acknowledgment, transmitting, by the access point, the access point status change report to the server at a randomly selected time within the retry period.

In another aspect of the invention an access point is provided. The access point may include a transceiver that receives a child status change report from a child mesh device associated with the access point, the child status change report including status change information for one or more child mesh devices that have experienced a status change. The access point may also include a processor that determines a random period based on a number of child mesh devices that have experienced a status change; and prepares an access point status change report, including information from the received child status change report. The transceiver may transmit the access point status change report to a server at a randomly selected time within the random period.

In yet another aspect of the invention, a system is provided including a mesh device and an access point. The mesh device is associated with the access point, such as via a mesh network, and experiences a status change. The mesh device may determine that the status change has occurred for a period of time at least as long as a predetermined recognition period; and may transmit a device status change report to an access point during a reporting window within a reporting period, the reporting window based on a number of hops the mesh device is located from the access point. The access point may receive the device status change report from the mesh device; and may transmit an access point status change report including the device status change report to a server at a randomly selected time within a random period, the random period based on a number of child mesh devices that have experienced a status change These and other aspects of the invention will be better understood by reading the following detailed description and appended claims.

DETAILED DESCRIPTION

All terms used herein are intended to have their ordinary meaning in the art unless otherwise provided.

Figure 1:
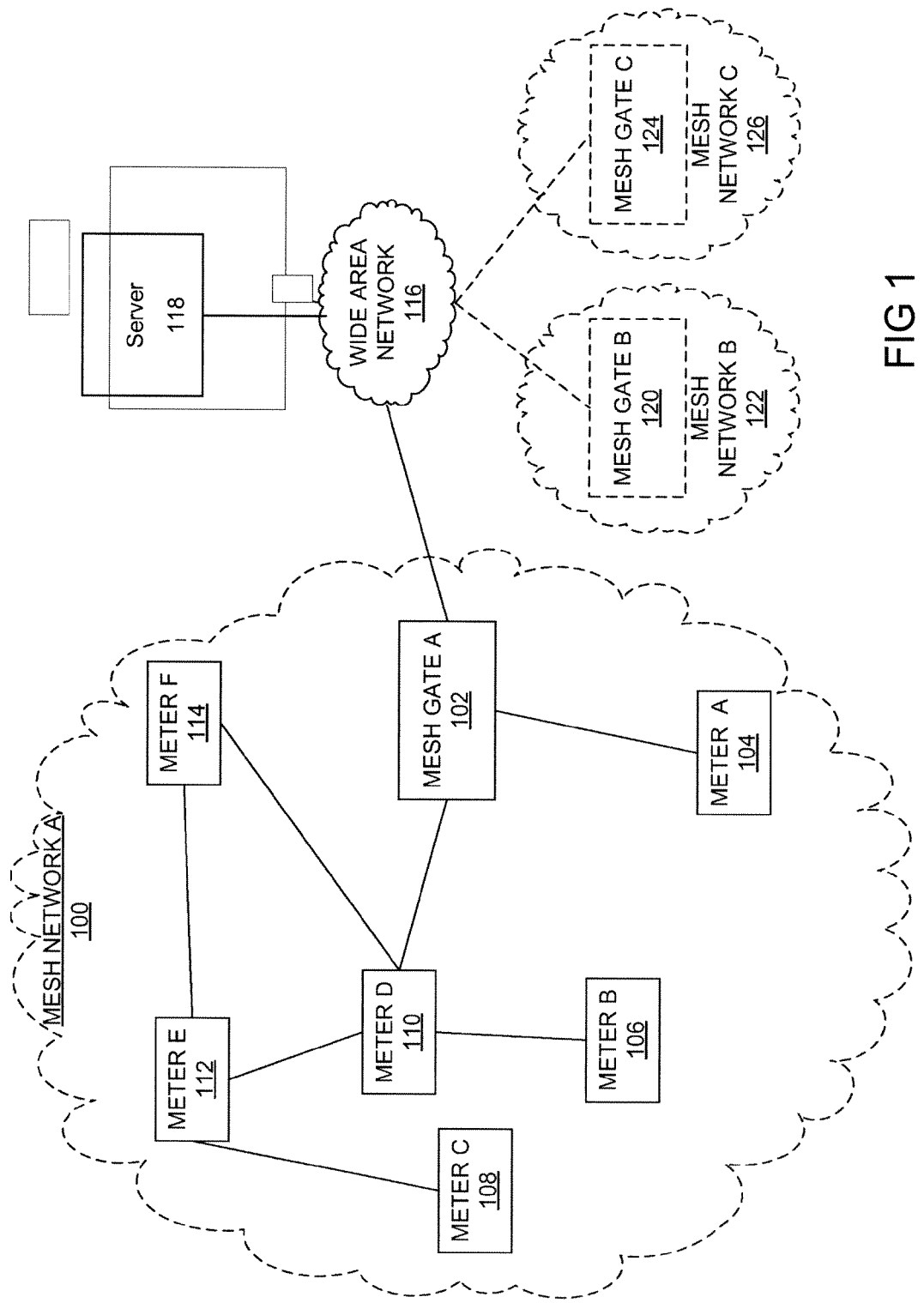
FIG. 1 illustrates an exemplary system for providing smart grid communications over a mesh network.

Referring to FIG. 1, an exemplary smart grid system for providing status change information within and to/from at least one mesh network is illustrated. As shown, a mesh network A 100 may include a NAN access point (e.g., mesh gate A) 102 and a plurality of meters: meters A 104, B 106, C 108, D 110, E 112, and F 114. A NAN access point may be referred to herein as a mesh gate, NAN-WAN gate, a collector, or a concentrator. The mesh gate A 102 may communicate with a server 118 over a wide area network (WAN) 116 and it will be appreciated that any number of mesh gates may communicate with the server (e.g., mesh gate B 120 and mesh gate C 124).

In addition to the mesh gate A 102, the mesh network A 100 may include a plurality of mesh devices, e.g., meters (as shown) or communication hubs, which cover a geographical area. The mesh devices may be in communication with or may otherwise include one or more utility sensors for monitoring utility usage, such as gas, water, or electricity usage and usage patterns at a specific customer location. Alternative mesh devices may include thermostats, user displays, and other components for monitoring utilities, which may be part of a home area network ("HAN"). As discussed in detail below, the mesh gate A 102 may aggregate information from mesh devices (meters A 104, B 106, C 108, D 110, E 112, and F 114) within the mesh network A 100 and transmit the information to the server 118.

The meters A 104, B 106, C 108, D 110, E 112, and F 114 may be associated with the mesh network A 100 through direct or indirect communications with the mesh gate A 102. Each meter may forward transmissions from other meters within the mesh network A 100 towards the mesh gate A 102. It will be appreciated that while only six meters are depicted in the mesh network A 100, any number of mesh devices may be deployed to cover any number of utility lines or locations, subject to bandwidth constraints with the mesh network and the mesh gate.

As depicted, only meters A 104 and D 110 are in direct communications with mesh gate A 102. However, meters B 106, E 112 and F 114 can all reach mesh gate A 102 through meter D 110. Similarly, meter C 108 can reach mesh gate A 102 through meter E 112 and meter D 110. Accordingly, meter A 104 may be described as being 1 "hop" from mesh gate A 102; meter D 110 may be described as being 2 "hops" from mesh gate A, and meter C 108 may be described as being 3 "hops" from mesh gate A.

It will be appreciated that the WAN 116 may be any communication medium capable of transmitting digital information. For example, the WAN 116 may be the Internet, a cellular network, a private network, a phone line configured to carry a dial-up connection, or any other network.

The head end server 118 may be a computing device configured to receive information, such as status change information, meter readings, or any other data from a plurality of mesh networks and meters. The server 118 may also be configured to transmit instructions to the mesh networks, mesh gates, and mesh devices. In certain embodiments, the server 118 may be a central processing system including one or more computing systems (i.e., one or more server computers). Where the head end includes more than one computing system, the computing systems can be connected by one or more networks and the system may be referred to as a "backhaul network" or back end system.

The number of mesh networks, e.g., mesh networks B 12 and C 126 are similar to mesh network A 100 in operation, as discussed above. Moreover, descriptions of exemplary mesh networks, including electric meters and other mesh devices, can be found in commonly owned U.S. patent application Ser. No. 12/275,252, titled "Method and System for Creating and Managing Association and Balancing of a Mesh Device in a Mesh Network," filed Nov. 21, 2008, which is incorporated herein by reference in its entirety.

Figure 2A:
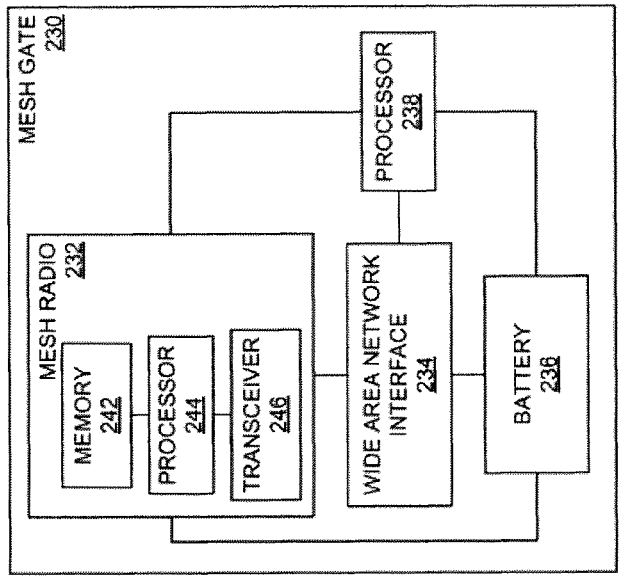
FIG. 2A illustrates an exemplary meter device for use within a mesh network.

Referring to FIG. 2A, an exemplary mesh device (e.g., meter) for use within a mesh network is shown. A mesh device 200 may include a radio 202, a communication card 204, a metering sensor 206, and a battery or other power or energy storage device 208. The radio 202 may include a memory 210, a processor 212, a transceiver 214, and a microcontroller unit (MCU) 216. Generally, the communication card 204 may interface between the radio and a sensor 206 and sensor readings may be converted to radio signals for transmission over the radio. The memory 210 may store instructions and run-time variables for execution. For example, the memory 210 may include both volatile and non-volatile memory. The memory 210 may also store a history of sensor readings from the metering sensor 206 and an incoming queue of server instructions. As discussed below, the memory may store status information of the mesh device, and may also store status information received from one or more child mesh devices.

A mesh device 200 may communicate with an access point and other mesh devices over a mesh network. For example, the mesh device 200 may be an electricity smart meter installed in a residential building or other location to monitor electricity usage. The meter may also control access to energy in response to server instructions, for example, by reducing or stopping the flow of electricity.

In certain embodiments, one or more mesh devices 200 may provide a status change report to a head end server in real-time or near real-time via an access point. As used herein, a "status change" may refer to a loss of power (i.e., a power outage) or a restoration of power (i.e., a power restoration). In the event of an outage, the mesh device may employ a secondary power source that backs up the device's real-time clock, such as a battery, super capacitor or the like 208, to provide a "last gasp" of activity. For example, a super capacitor may provide the mesh device with about 15 seconds of recognition time to determine whether a power outage is momentary or lasting and another about 7.5 seconds of time for "last-gasp" radio transmissions.

In one embodiment, a mesh device first determines that a status change has occurred for a period of time lasting at least as long as a predetermined recognition period. The predetermined recognition period may be any amount of time allowed by the secondary power source, such as but not limited to, from about 5 seconds to about 30 seconds, from about 10 seconds to about 25 seconds, or about 15 seconds. Generally, if a mesh device becomes affected by an outage, it may enter a "sleep" mode for the duration of the recognition period, wherein the radio and/or the processor are shut down to preserve the backup power.

If a status change ends prior to the end of the recognition period, the device may resume normal operation and may record the momentary status change in memory. The recorded status change may then be reported by a mesh device in non-real-time as part of a normal, scheduled reporting process (e.g., daily).

However, if the status change persists beyond the recognition period, a mesh device may employ an aggregated real-time or near real-time power outage/restoration reporting (RTPOR) algorithm to report the status change to a parent node. Because the mesh device may be aware of its location within the mesh network defined by each NAN access point, the aggregated algorithm may be location-based, such that the mesh device may autonomously transmit status change report(s) in a way that increases the probability of the report(s) successfully reaching the NAN access point.

In one embodiment, each mesh device receiving a status change report or experiencing a status change may prepare and broadcast an aggregated status change report to one or more of its parent mesh devices during a reporting period. A reporting period may comprise from about 1 to about 5 seconds, for example, about 1.5 seconds. Generally, the reporting period may depend on the secondary source of power employed at the mesh device.

During the reporting period, a mesh device may transmit a status report at a reporting time within a reporting window. The reporting period may be divided into any number of reporting windows, and the mesh device may transmit the status report once (e.g., at a random reporting time), during each reporting window. Accordingly, the mesh device may send status report(s) multiple times during the reporting period.

According to one embodiment, each mesh device may employ a reporting window based on its distance from an access point. For example, a mesh device may determine a reporting window based on a number of hops the mesh device is located from an access point with which it is associated. Each mesh device may employ its knowledge of the mesh network so that devices far from the access point may transmit their information more frequently to increase the probability of successfully reaching their parent devices, while devices near the access point may transmit less frequently to provide more time to aggregate data from child devices and decrease the likelihood of collisions. Generally, the mesh device's clock may be implemented to determine the reporting window and/or reporting time and a timer may be set to begin at the end of the recognition period.

By way of non-limiting example, a mesh device located 1 hop from the access point may employ a reporting window of about 500 ms, a mesh device located 2 hops from the access point may employ a reporting window of about 300; a mesh device located 3 hops from the access point may employ a reporting window of about 214 ms; and so on according to the equation below:

$$\text{Reporting Window}_{(device\ at\ n\ hops)} = \text{reporting period}/(1+n)$$

In one embodiment, a mesh device may prepare a status change report including information about a status change. Such information may include, for example, the start time and end time of the status change, the duration of the status change, the identity of the mesh device, and/or the location of the mesh device. A report may be prepared during each reporting window, or a single report may be prepared and repeatedly transmitted.

In one embodiment, the mesh device may receive one or more child status change reports from one or more child mesh devices. During each reporting window, the mesh device may check for such child status reports and, in certain embodiments, may include information from such reports in the status change report to be transmitted to the mesh device's parent node. In other words, the mesh device may aggregate status change reports from one or more child mesh devices in the mesh network during one or more reporting windows.

For example, during each reporting window, each mesh device in a mesh network may check whether it has received new child status change reports and, if so, may broadcast an aggregated status change report including this new information. Regardless of whether child status change reports are received or not, mesh devices may continue re-broadcasting the aggregated status change report at each reporting window, either until adequate power is no longer available for transmission or for a total of the entire reporting period.

As used herein, the term "child" refers to a mesh device located a further distance away from an access point than the reference mesh device. Similarly, the term "parent" refers to a mesh device located closer to the access point than the reference mesh device. By way of example, if a reference mesh device is located 2 hops from an access point, a mesh device located 1 hop from the access point may be referred to as a "parent mesh device," and a mesh device located 3 hops from the access point may be referred to as a "child mesh device," with respect to the reference mesh device.

In certain embodiments, the mesh device may suspend local generation of all other message transmissions, including but not limited to keep-alive messages and neighbor exchange procedures as used by the NAN network layer protocol, and may suspend the relay of data packets from other nodes in the mesh network.

The aggregated RTPOR process is extremely useful in reporting random, isolated power outages as well as restoration of power after any type of outage. After power is restored, the device will use the routing tables and other data stored in its nonvolatile memory to resume communications with the access point to which it belonged before the outage. If communications cannot resume as before, then a new association process will be initiated, for example, as discussed in U.S. patent application Ser. No. 12/554,135, titled "System and Method for Implementing Mesh Network Communications Using a Mesh Network Protocol," which is incorporated herein by reference in its entirety.

Figure 2B:
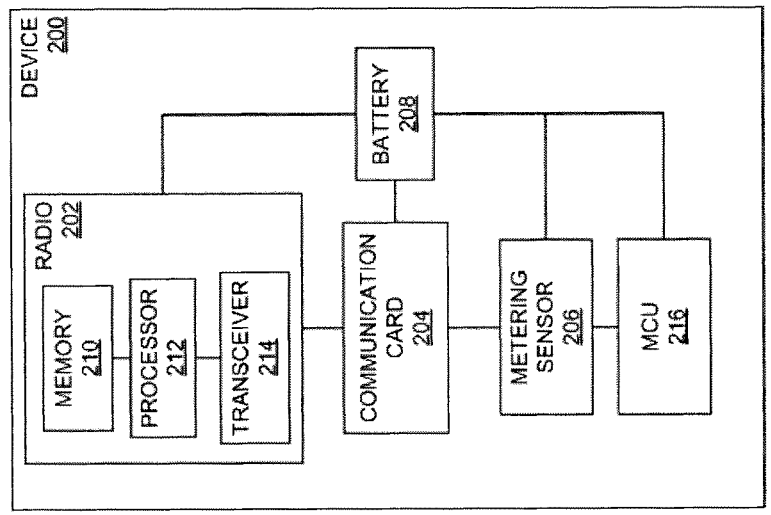
FIG. 2B illustrates an exemplary access point for use within a mesh network.

Referring to FIG. 2B, an access point (i.e., mesh gate 230) for use within a mesh network is illustrated. As shown, the mesh gate 230 may include a mesh radio 232, a wide area network interface 234, a battery 236, and a processor 238. The mesh radio 232 may include a memory 242, a processor 244, and a transceiver 246. The mesh gate 230 may also include a WAN interface 234, a battery 236 and a processor 238. By acting as a gateway, the access point forwards information and instructions between the meters in its mesh network and the server. The access point may also function as a node within the mesh network, by forwarding messages between meters.

As status change reports are received at the access point 230, it may timestamp and aggregate these messages (adding its own status information, as appropriate) into a report of confirmed outages that is delivered to the head-end in real-time. Generally, operation of the access point during a power outage requires that it be equipped with a battery backup 236, either integrated as part of the device or supplied as an external unit. Typically, the lead-acid batteries used for backup provide at least 8 hours of operation at 20° Celsius. For such lead-acid batteries, the lifetime is typically 5-7 years before they should be replaced as routine maintenance.

In one embodiment, the access point may aggregate the status change reports from one or more child mesh devices such that they may be reported to a head end. The access point may prepare its own status change report including, for example, a status report table listing all mesh devices associated with the reporting access point for which there has been a change in status (including itself, if applicable). The access point may then transmit the status change report in real-time or near real time to a head end server. In certain embodiments, a real-time status change report may be continually updated while the reporting process is underway, and the most recent changes in device status throughout the system may be ready to be transmitted at any given moment.

Figure 3:
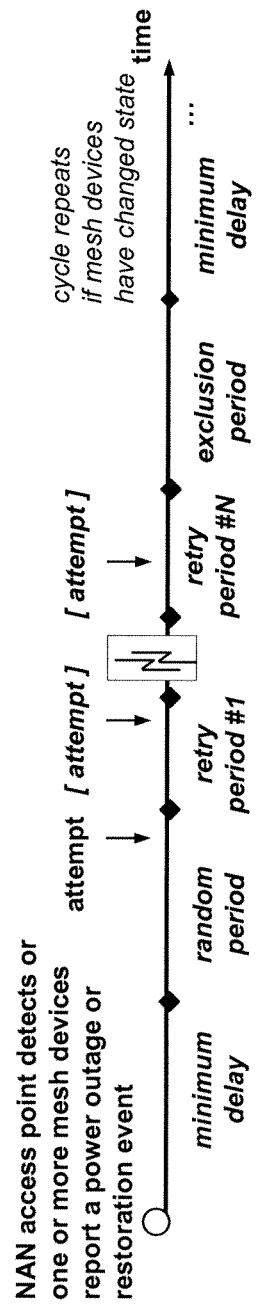
FIG. 3 illustrates a reporting timeline for an access point in accordance with a preferred embodiment described herein

Referring to FIG. 3 an exemplary sequence followed by an access point to report to its notification server(s) when a power outage or power restoration event occurs and/or has been reported by one or more associated nodes to an access point is illustrated.

As shown, once a status change has been detected locally or a status change has been reported by one or more associated nodes, the access point may wait for a predetermined minimum delay before transmitting the status change report to a head end server. During the minimum delay, incoming status change reports from mesh devices or local status change events occurring at the access point may be aggregated into a single status change report. After successful reporting the status change report to a server, the minimum delay restarts (and may repeat indefinitely) to aggregate additional incoming status change reports as they are received and local status change events as they occur. The minimum delay may be any amount of time, for example from about 30 seconds to about 60 seconds, or about 45 seconds.

Generally, the access point may determine certain parameters used in the reporting process based on the number of devices affected by a power outage or power restoration. For example, if the number of devices that have changed status exceeds a certain threshold, the values for such notification parameters as the "random period" and "retry period" (discussed below) employed throughout the reporting process may be adjusted. Although the threshold may be set to any value, in certain embodiments, the threshold may be from about 10% to about 30% of the mesh devices associated with the access point, or more particularly, about 20% of such devices.

As shown in FIG. 3, after the minimum delay is over, the access point attempts to transmit the status change report to a first configured notification server at an instant in time randomized over a random period. The random period defines the maximum duration that the access point may wait before attempting transmission, and only one attempt is allowed within this period. Generally, the random period may be from about 5 seconds to about 30 seconds, or from about 10 seconds to about 20 seconds (e.g., about 15 seconds) when less than the threshold number of child devices experience a status change. When greater than the threshold number of child devices experience a status change, the random period may range from about 30 seconds to about 60 seconds (e.g., about 45 seconds).

In one embodiment, upon sending a status change report to a head end server, the access point may listen for an acknowledgment from the server that the report was received. If the access point does not successfully receive an acknowledgement from the server, the transmission attempt may be assumed to have failed, and the next attempt may occur over a retry period. The attempt may be initiated at a random instant over the retry period, and only one attempt may be allowed within this period. Generally, the retry period may be from about 10 seconds to about 60 seconds (e.g., about 15 seconds, about 30 seconds, or about 45 seconds) when less than the threshold number of child devices experience a status change. When greater than the threshold number of child devices experience a status change, the retry period may range from about 30 seconds to about 60 seconds (e.g., about 45 seconds).

If the transmission again fails, retries are attempted in successive retry windows until the transmission is successful or the number of maximum retries has been reached. Generally, each retry may be attempted over a retry period, as described above. Moreover, the maximum number of retries may be set to any value (e.g., 1, 2, 3, 4, 5, etc.).

However, if the server acknowledges successful transmission, then, for that specific server, the status of each associated node for which a status change has been communicated may be reset. If more than one server has been configured by the access point, then, for each notification server, the above steps may be repeated.

In certain embodiment, after the real-time status change report has been successfully or unsuccessfully transmitted to all notification servers as described above, the access point may wait for an exclusion period to ensure that all other access points in the network are able to reach the notification servers before transmitting an additional status change report. The exclusion period may last from about 30 seconds to about 120 seconds, including but not limited to about 30 seconds, about 60 seconds, about 90 seconds, or about 120 seconds.

If additional status changes occur during the exclusion period, then the above described process may be repeated. In other words, after the exclusion period has elapsed, any incoming status change reports received or local status change events occurring since the last report or during the exclusion period may trigger another cycle, beginning with the minimum delay. If new child status change reports are received after the status change report has been reported to a first server, but prior to being reported to another server, then the first notification server may only be informed of the new events once the process has been reinitiated.

Unless specifically stated otherwise as apparent from the foregoing discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

Some exemplary embodiments described herein are described as software executed on at least one processor, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the interne, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

The invention claimed is:

1. A method for reporting a status change comprising:
   determining, by a mesh device, that a status change has occurred for a period of time at least as long as a predetermined recognition period;
   determining, by the mesh device, one or more reporting windows within a reporting period, based on a number of hops the mesh device is located from an access point with which the mesh device is associated, wherein the one or more reporting windows is determined based on: (the reporting period)/(1+n), where n is the number of hops;
   receiving, by the mesh device, at least one child status change report from one or more child mesh devices associated with the access point;
   preparing, by the mesh device, a device status change report, the device status change report including the one or more child status change reports; and
   transmitting, by the mesh device, the device status change report to one or more parent mesh devices during the reporting window within the reporting period.

2. A method according to claim 1, wherein the status change is a power outage or power restoration.

3. A method according to claim 1, wherein the recognition period comprises about 15 seconds.

4. A method according to claim 1, wherein a radio and a processor of the mesh device are shut down during the recognition period.

5. A method according to claim 1, wherein the reporting period comprises from about 1 second to about 5 seconds.

6. A method according to claim 5, wherein the reporting period comprises about 1.5 seconds.

7. A method according to claim 1, wherein the reporting window comprises about 500 ms when the mesh device is located 1 hop from the access point.

8. A method according to claim 1, wherein the reporting window comprises about 300 ms when the mesh device is located 2 hops from the access point.

9. A method according to claim 1, wherein the reporting window comprises about 214 ms when the mesh device is located 3 hops from the access point.

10. A method according to claim 1, wherein the device status change report is transmitted at a random reporting time within the reporting window.

11. A method according to claim 1 further comprising listening, by the mesh device, for an acknowledgment from the one or more parent devices and, upon failing to receive the acknowledgement, repeating said receiving, preparing and transmitting.

12. A mesh device comprising:
   a processor for:
      determining that a status change has occurred for a period of time at least as long as a predetermined recognition period;
      determining one or more reporting windows within a reporting period, based on a number of hops the mesh device is located from a access point with which the mesh device is associated, wherein the one or more reporting windows is determined based on: (the reporting period)/(1+n), where n is the number of hops; and
      preparing a device status change report;
   a transceiver for:

receiving at least one child status change report from one or more child mesh devices associated with the access point; and transmitting the device status change report to one or more parent mesh devices during the one or more reporting windows within the reporting period, the device status change report including the one or more child status change reports.

13. A mesh device according to claim 12, wherein the status change is a power outage or power restoration.

14. A mesh device according to claim 12, wherein recognition period comprises about 15 seconds.

15. A mesh device according to claim 12, wherein the transceiver and the processor are shut down during the recognition period.

16. A mesh device according to claim 12, wherein the reporting period comprises from about 1 second to about 5 seconds.

17. A mesh device according to claim 16, wherein the reporting period comprises about 1.5 seconds.

18. A mesh device according to claim 12, wherein the reporting window comprises about 500 ms when the mesh device is located 1 hop from the access point; about 300 ms when the mesh device is located 2 hops from the access point; or about 214 ms when the mesh device is located 3 hops from the access point.

19. A mesh device according to claim 12, wherein the device status change report is transmitted at a random reporting time within the reporting window.

20. A mesh device according to claim 12, wherein the transceiver listens for an acknowledgment from the one or more parent devices and, upon failing to receive the acknowledgement, the processor repeats said preparing and said transceiver repeats said receiving and transmitting.

21. A method of transmitting a status change to a server comprising:

receiving, by an access point, a child status change report from a child mesh device associated with the access point, the child status change report including status change information for one or more child mesh devices that have experienced a status change;

determining, by the access point, a random period based on a number of child mesh devices that have experienced a status change;

preparing, by the access point, an access point status change report, including the information from the received child status change report; and transmitting, by the access point, the access point status change report to a server at a randomly selected time within the random period.

22. A method according to claim 21 further comprising:

determining, by the access point, a retry period based on the number of child mesh devices that have experienced a status change;

listening, by the access point, for an acknowledgement from the server; and upon failing to receive the acknowledgment, transmitting, by the access point, the access point status change report to the server at a randomly selected time within the retry period.

23. The method of claim 22 further comprising repeating said listening step and, upon failing to receive the acknowledgment, repeating said transmitting of the access point status change report during a second retry period.

24. A method according to claim 21, wherein said random reporting period is from about 10 seconds to about 20 seconds when less than a threshold number of the child mesh devices experience a status change.

25. A method according to claim 24, wherein said random reporting period is from about 30 seconds to about 60 seconds when more than a threshold number of the child mesh devices experience a status change.

26. A method according to claim 25, wherein said threshold number comprises from about 10% to about 30% of the child mesh devices associated with the access point.

27. A method according to claim 26, wherein said threshold number is about 20% of the child mesh devices associated with the access point.

28. A method according to claim 21, further comprising resetting the status of each of the child mesh devices that have experienced a status change, upon receiving an acknowledgment of a successful transmission from the server.

29. A method according to claim 21, wherein said status change comprises a power outage or power restoration.

30. An access point comprising:

a transceiver:

receiving a child status change report from a child mesh device associated with the access point, the child status change report including status change information for one or more child mesh devices that have experienced a status change;

a processor:

determining a random period based on a number of child mesh devices that have experienced a status change; and preparing an access point status change report, including information from the received child status change report;

wherein the transceiver transmits the access point status change report to a server at a randomly selected time within the random period.

31. An access point according to claim 30 wherein:

the processor determines a retry period based on the number of child mesh devices that have experienced a status change; and the transceiver listens for an acknowledgement from the server and, upon failing to receive the acknowledgment, transmits the access point status change report to the server at a randomly selected time within the retry period.

32. An access point according to claim 30, wherein said random reporting period is from about 10 seconds to about 20 seconds when less than a threshold number of the child mesh devices experience a status change.

33. An access point according to claim 32, wherein said random reporting period is from about 30 seconds to about 60 seconds when more than a threshold number of the child mesh devices experience a status change.

34. An access point according to claim 33, wherein said threshold number comprises from about 10% to about 30% of the child mesh devices associated with the access point.

35. An access point according to claim 34, wherein said threshold number is about 20% of the child mesh devices associated with the access point.

36. An access point according to claim 30, wherein said status change comprises a power outage or power restoration.

37. A system comprising:

(i) a mesh device associated with an access point, the mesh device experiencing a status change and:

determining that the status change has occurred for a period of time at least as long as a predetermined recognition period; and transmitting a device status change report to an access point during a reporting window within a reporting period, the reporting window based on a number of hops the mesh device is located from the access point;

(ii) the access point:

receiving the device status change report from the mesh device; and transmitting an access point status change report including the device status change report to a server at a randomly selected time within a random period, the random period based on a number of child mesh devices that have experienced a status change.

38. A system according to claim 37, wherein the device status change report includes a child status change report.

39. A system according to claim 37, wherein the status change comprises a power outage or power restoration.

* * * * *